United States Patent [19]

Azari

[11] Patent Number: 5,268,050

[45] Date of Patent: Dec. 7, 1993

[54] PROCESS FOR USING AN EXTRUDER DIE ASSEMBLY FOR THE PRODUCTION OF FIBER REINFORCED THERMOPLASTIC PELLETS, TAPES AND SIMILAR PRODUCTS

[75] Inventor: Arsalan D. Azari, Cuyahoga Falls, Ohio

[73] Assignee: Ferro Corporation, Cleveland, Ohio

[21] Appl. No.: 711,176

[22] Filed: Jun. 5, 1991

[51] Int. Cl.$^5$ .......................... B32B 1/00; D04H 3/12
[52] U.S. Cl. ............................. 156/180; 156/166; 156/245; 156/433; 118/420; 425/114; 264/136
[58] Field of Search ............... 156/166, 180, 245, 242, 156/441, 433; 425/114, 122; 264/136, 174; 118/420; 427/434.2

[56] References Cited

U.S. PATENT DOCUMENTS

| | | | |
|---|---|---|---|
| 2,751,320 | 6/1956 | Jacobs et al. | 156/180 |
| 3,993,726 | 11/1976 | Moyer | 264/174 |
| 4,541,884 | 9/1985 | Cogswell et al. | |
| 4,728,387 | 3/1988 | Hilakos | |
| 4,792,481 | 12/1988 | O'Connor et al. | |
| 4,864,964 | 9/1989 | Hilakas | 156/180 X |
| 5,002,712 | 3/1991 | Goldmann et al. | 264/136 X |
| 5,026,447 | 6/1991 | O'Connor | 156/180 X |
| 5,084,305 | 1/1992 | Marttila | 427/434.2 X |
| 5,114,516 | 5/1992 | Pilling et al. | 156/166 X |
| 5,116,450 | 5/1992 | Spoo et al. | 156/180 X |

FOREIGN PATENT DOCUMENTS

| | | | |
|---|---|---|---|
| 3835575 | 4/1990 | Fed. Rep. of Germany | 156/180 |
| 262377 | 12/1968 | U.S.S.R. | 425/114 |

*Primary Examiner*—Jeff H. Aftergut
*Attorney, Agent, or Firm*—Renner, Otto, Boisselle & Sklar

[57] ABSTRACT

The invention provides an extruder die assembly for use in the production of fiber reinforced thermoplastic product which overcomes the problem of poor wetting of the fiber filaments. The die assembly also facilitates the production of fiber-reinforced products having high fiber concentration in the end product. The die assembly includes a cone-shape passage defined by decreasing radius from the inlet to the outlet. A plurality of pins are disposed within the passage. A thermoplastic melt is fed through the die assembly in the opposite direction to that of the fiber feed. As the fiber feed travels through the passage the pins spread the fibers helping to ensure that the molten thermoplastic thoroughly wets the fiber filaments.

10 Claims, 2 Drawing Sheets

PROCESS FOR USING AN EXTRUDER DIE ASSEMBLY FOR THE PRODUCTION OF FIBER REINFORCED THERMOPLASTIC PELLETS, TAPES AND SIMILAR PRODUCTS

BACKGROUND OF THE INVENTION

1. Field of the Invention

The invention relates to a cross-head extruder die assembly for producing fiber-reinforced thermoplastic pellets, tapes and similar products having a high fiber concentration and a process for using the same. More specifically, the invention relates to a cross-head extruder die assembly for achieving substantially the complete wetting of the filaments of multifilament strands with molten thermoplastic when producing a pultruded fiber-reinforced thermoplastic product.

2. State of the Art

Initially, pultrusion technology was limited primarily to reinforced articles produced utilizing thermosetting resins. Such products were manufactured using conventional pultrusion methods wherein resin-coated fibers are pulled through a converging heated die to form solid rods, tubes or other shapes. However, in such cases high pulling forces are generally required to move the article through the die even when low viscosity thermosetting resins are used. Thus, these methods are generally limited to the use of high strength filaments. Furthermore, the pultruded article must be gripped in some way to transmit the pulling force to the article being pulled through the die. Some articles, such as a thin wall tube, do not have sufficient strength to permit these articles to be gripped tightly enough to pull them through the die. Additionally, processing rates are generally quite slow, being in the range of 2 to 10 ft. per minute. Generally, these slow rates are due to the need to cure the thermosetting polymer by heating and the fact that the pulling force required increases rapidly with increasing speed and the increasing viscosity of the resin as the resin solidifies. Although such processes have been known for at least 15 years, they have generally not been used commercially to any great extent for the production of resin impregnated structures.

Due to the much higher viscosities of thermoplastic resins, standard pultrusion dies and techniques could not be utilized except under extremely high pulling forces, and then only at very slow speeds. U.S. Pat. No. 3,470,051 discloses the use of a thermoplastic emulsion coated roving and pultrusion equipment. In addition to being relatively slow, this method also requires a drying step which further reduces its effectiveness.

Reinforced thermoplastic materials are generally produced by compounding a reinforcing material and a thermoplastic material together on, for example, a two roll mill or in an extruder and then comminuting the crepe of extrudate thus obtained to produce granules which are subsequently molded to form the desired articles. However, cheap reinforcing fibers, particularly glass fibers are often supplied as continuous rovings consisting of several groups of filaments. Generally, it is difficult to produce satisfactory molding granules from these rovings because thermoplastic material cannot be adequately distributed throughout the roving thus leading to an unacceptable dispersion of the glass in the subsequently molded product. The present invention is directed towards overcoming this disadvantage.

Other prior art methods for preparing thermoplastic rods or tubes reinforced with glass or other fibers have deficiencies which tend to limit the quality of the products produced or the speed of the preparation. For example, U.S. Pat. No. 3,042,570 describes an apparatus and a method for preparing pellets of thermoplastic resins reinforced with glass fibers which involves passing continuous lengths of glass roving or stands into an impregnating bath of molten polymer, removing the impregnated strand bundles through various orifices, cooling the bundles, and then cutting them into lengths suitable for use in injection molding. The equipment is designed to coat the impregnated fiber bundle with a significant amount of polymer so that there is a relatively low fiber content by weight in the final product. Furthermore, the pressure on the impregnating bath is a very low pressure obtained by forcing solid plastic pellets into a melt bath using a feed screw. U.S. Pat. No. 2,877,501 describes a similar method of making glass reinforced thermoplastic injection molded pellets having a glass fiber content of 15–60% by weight. Among the potential deficiencies of these prior art methods is that the impregnation is often not complete or uniform. Additionally, high fiber contents generally cannot be obtained.

Various other processes for impregnating glass fibers and the like are further discussed in the art. For example, U.S. Pat. No. Re 32,772 discloses a compound composite structure produced by imbedding the fibers with a first resin followed by using this composite as an insert in an injection molding die so that a second resin may be molded around the composite.

U.S. Pat. No. 4,937,028 discloses forming a fiber reinforced product using a minimum of wetting resin via a two stage process. The first stage involves spreading the rovings by first passing the rovings through a bar zone (baffle) and applying force perpendicular to the width of the rovings which causes spreading of the fiber and the resultant sheet/strip is then impregnated with wetting resin and is drawn before the molding die. In a second stage, the system consists of bar zones formed by baffles substantially parallel with the first one. In this system the sheet/strip formed is impregnated with wetting resin and passes into at least two baffles opposite and parallel to each other. The system of bar zones before and after contact with the wetting resin allows for the individual impregnation of the fibers with a minimum amount of polymer.

U.S. Pat. No. 3,742,106 discloses a continuous process for producing fiber reinforced thermoplastic materials comprising passing a roving of fibers through a bed of powdered thermoplastic; separating the roving while it is in the bed; heating the roving impregnated with powdered thermoplastic to a temperature greater than the melting point of the thermoplastic resin; and passing the roving through a die while the thermoplastic is molten in order to form a fiber reinforced thermoplastic product.

U.S. Pat. Nos. 4,549,920 and 4,559,262 disclose a fiber-reinforced structure and the process for producing the structure which includes tensioning and aligning the filaments; urging the roving against a heated spreader surface to form a nip between the band of filaments and spreader surface; and heating the spreader at a temperature sufficient to maintain the polymer in the form of a melt in order to achieve complete wetting.

United Kingdom Patent No. 1302048 discloses the production of glass-filled thermoplastic polymer pellets suitable for blending with thermoplastic polymers which process comprises feeding an extruded mixture of silane coupling agent and molten thermoplastic polymer to a cross-head die, coating a continuous glass roving with said mixture in said cross-head die, solidifying said mixture while the same is coated on the roving, and subsequently pelletizing the final product into pellets suitable for use in injection molding.

U.S. Pat. No. 3,993,726 discloses a method of making reinforced plastic continuous length members by passing one or more rovings of glass or other temperature resistant fibers through a cross-head extruder to extrude and impregnate the fibers with a thermoplastic polymer.

SUMMARY OF THE INVENTION

In accordance with the present invention, a die assembly for receiving a plurality of multifilament fibers is provided to produce a fiber-reinforced thermoplastic product comprising:
a) an axial forming passage with a substantially converging radiused outlet and a diverging radiused inlet;
b) the passage defined by a decreasing radius from the inlet to the outlet;
c) the passage being divided into at least two substantially similar sections; and
d) the similar sections having a plurality of pins disposed between the inlet to the outlet within each of the sections.

Also in accordance with the present invention, a process is provided for producing a fiber reinforced thermoplastic product having a high fiber concentration comprising the steps of:
a) feeding one or more multifilament fibers into the inlet of a die assembly having a plurality of means for spreading said fibers to achieve good wetting of the filaments;
b) feeding under pressure a thermoplastic melt into the outlet region of the die to coat and wet said multifilament fibers being fed through the die in the opposite direction; and
c) obtaining fully wetted fibers at the outlet end of said die.

Further in accordance with the process of the present invention, the thermoplastic polymer employed to wet the filaments of the fiber is selected from the group consisting of polyester, polyamide, polysulphone, polyoxymethylene, polyolefin, polyarylene sulphide, polyphenylene oxide/polystyrene blends, polystyrene, polyetherketone, polyacrylate, polycarbonate, polyurethane, halogenated polymers and the mixtures and copolymers thereof.

Still further in accordance with the process of the present invention, the fibers entering the die assembly meet at the exit of the assembly to form a unitary fiber-reinforced structure wherein the impregnated fibers are produced at a high rate and the fiber reinforced thermoplastic product contains a high concentration of fibers.

Still further in accordance with the process of the present invention, the melt flow of the thermoplastic melt is rolling and dynamic within the die assembly thus maximizing the wetting of the spread fibers contacting the pins.

Still further in accordance with the present invention, a die assembly is provided wherein the position relative to the axis of each succeeding pin within each section alternates up and down (vertically) from the inlet to the outlet and wherein the planes of each of the pins are substantially parallel to the plane of the axis.

Still further in accordance with the die assembly of the present invention, the passage has the shape of a cone.

Still further in accordance with the present invention, each similar section contains at least four pins wherein the diameter of the pins is set to determine the level of tension for the fibers fed through the die assembly.

Still further in accordance with the die assembly of the present invention, at least one fiber is received through the inlet of the assembly and passed over and under of each succeeding pin of each section from the inlet to the outlet.

Still further in accordance with the present invention, a fiber-reinforced thermoplastic product is provided having a high concentration of fibers comprising at least one thermoplastic polymer and contiguous aligned filaments, the filaments having been wetted by the polymer and produced in a melt pultrusion process comprising:
a) feeding one or more multifilament fibers into the inlet of a die assembly having a plurality of means for spreading the fibers to achieve good wetting of the filaments;
b) feeding under pressure a thermoplastic melt into the outlet region of the die assembly to coat and wet the multifilament fibers being fed through the die assembly in the opposite direction to the melt; and
c) obtaining fully wetted fibers at the outlet of the die assembly.

Still further in accordance with the present invention, the fiber of the fiber-reinforced structure is selected from the group consisting of glass fibers, carbon fibers, jute, metal and synthetic polymer fibers.

Still further in accordance with the present invention a fiber-reinforced thermoplastic product is provided which may contain plasticizers, internal and external lubricants, mold release agents or molecular weight reducing agents for achievement of full wetting of the long fiber.

Still further in accordance with the present invention a fiber-reinforced thermoplastic product is provided which may contain heat stabilizers, antioxidants, UV stabilizers, light stabilizers, flame retardants, or smoke depressants in order to achieve the required application stability.

Still further in accordance with the present invention a fiber-reinforced thermoplastic product is provided which may contain crystalline nucleating agents, crystalline nucleating promoters, inorganic substrates, crystalline retarding agents and crystalline accelerators to enhance the dimensional and molding stability.

Still further in accordance with the present invention, a fiber-reinforced thermoplastic product is provided which is produced by a process having the advantages of ease of operation, higher operating speeds, substantially complete wetting of the filaments of the fibers, greater fiber concentration in the end product and increased output.

These and other aspects of the present invention will become clear to those of ordinary skill in the art upon the reading and understanding of the specification.

BRIEF DESCRIPTION OF THE DRAWINGS

This invention will be further described in connection with the attached drawing figures showing preferred embodiments of the invention including specific parts and arrangements of parts. It is intended that the drawings included as part of this specification be illustrative of the preferred embodiments of the invention and should in no way be considered as a limitation on the scope of the invention.

DETAILED DESCRIPTION OF THE PREFERRED EMBODIMENTS

The present invention overcomes several of the problems experienced with the prior art means for producing pultruded fiber-reinforced thermoplastic products. Specifically, such problems include poor wetting of the filaments comprising the fibers and slow operating speeds. The present invention overcomes these problems by feeding the fibers to be impregnated through a specially designed cross-head die assembly. The general design of the die assembly allows for the maximization of the contact of the thermoplastic melt with the filaments of a multifilament fiber. The process and die assembly are described in greater detail with reference to the drawings below.

Figure 1:
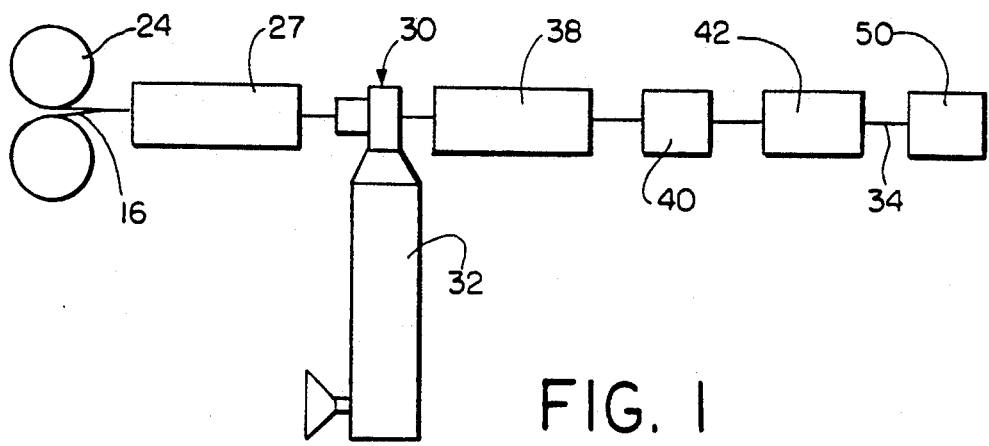
FIG. 1 is a schematic illustration of one preferred embodiment of the process according to the present invention showing the relationship of the various components and apparatus used in the process.

Referring now to FIG. 1, there is schematically shown the various pieces of equipment and apparatus necessary to carry out the process according to the present invention. Fibers 16, also known in the art as rovings, are taken off spools 24, preheated in oven 27, and then are fed through cross-head die assembly 30. A thermoplastic melt is delivered under pressure to die assembly 30 utilizing an extruder 32. A fully wetted and impregnated fiber product 34 in the shape of a rod exits the die assembly 30 and is cooled by water provided by cooling shower 38. Cooled product 34 is then dried by air wipe 40. The fibers 16 are pulled along the length of the system by a puller 42. The impregnated fiber product 34 is then fed into a pelletizer 50 wherein the product 34 is cut into pellets of desired length.

Figure 2:
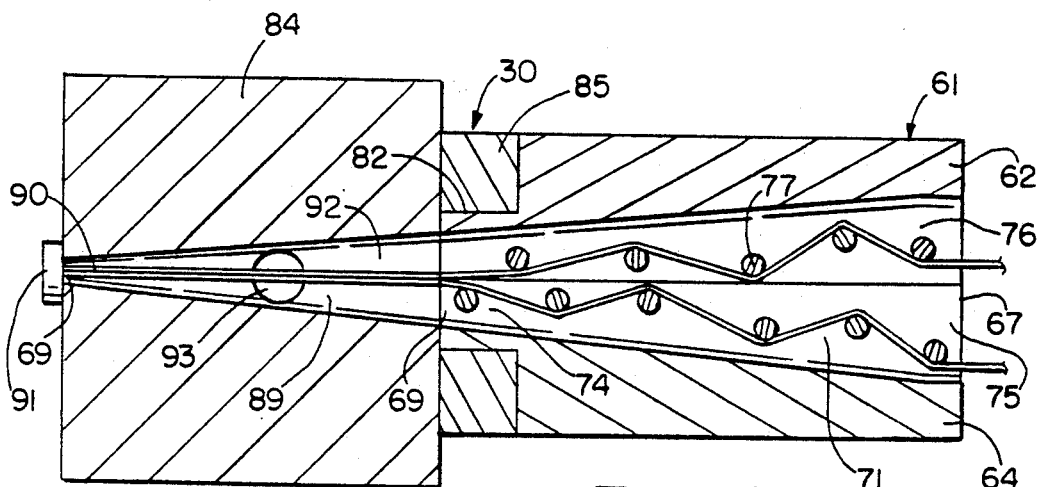
FIG. 2 is a longitudinal cross-sectional scale view of the die assembly according to the present invention.
Figure 3:
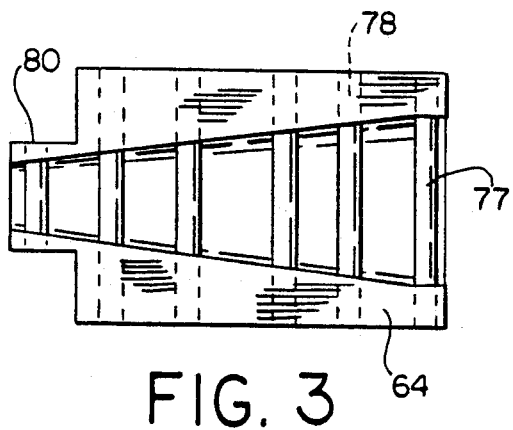
FIG. 3 is a top view of one section of the cone of the die assembly shown in FIG. 2.
Figure 4:
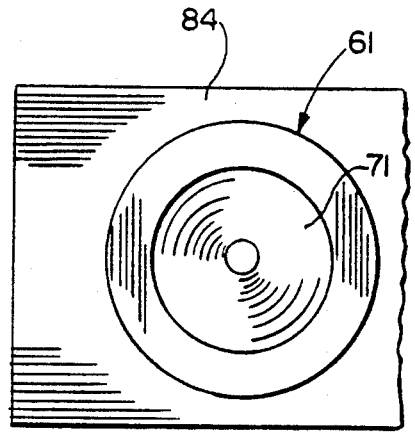
FIG. 4 is an end view of the die assembly shown in FIG. 2 with the pins of the cone and the sizing die removed.

Referring now to FIGS. 2-4 the specific structure of the die assembly 30 is more clearly shown. Specifically, die assembly 30 includes a cone 61 comprising an upper section 62 and a substantially similar lower section 64, and an inlet end 67 and an exit or outlet end 69. As shown in FIGS. 2 and 4 die assembly 30 is an interior conical cavity 71. The interior cavity 71 of the die assembly 30 includes an axial forming passage with a radiused converging outlet 74 and a radiused diverging inlet 76. Located in the immediate proximity of the radiused diverging inlet 76 is a substantially non-radiused portion 75. Non-radiused portion 75 has a substantially constant diameter. Disposed in the upper section 62 and the lower section 64 are a plurality of pins 77. Pins 77 are press fit into openings 78 which extend along the width of the upper and lower sections 62 and 64. Pins 77 extend substantially parallel to the horizontal axis of the die assembly 30.

Upper section 62 and lower section 64 each include a shoulder 80 which is received within an opening 82 formed within a flange 85 protruding from extruder die 84. Upper section 62 and lower section 64 are releasably held within opening 82 using any one of a variety of devices such as a bolt or pin. Quick removal of the sections 62 and 64 from extruder die 84 facilitates the quick servicing of the die assembly 30 in the event a strand of fiber 16 breaks or such other complication develops. The two-piece construction (i.e. upper section 62 and lower section 64) also facilitates the initial feeding of the fibers 16 through the die assembly 30.

As shown in FIG. 2 die 84 also includes an interior cavity 89 having an axial forming conical passage with a radiused converging outlet 90 and a radiused diverging inlet 92. Located at the outlet 90 of the extruder die 84 is a conventional sizing die 91. Molten thermoplastic is fed by the extruder 32 to the interior cavity 89 via feed opening 93 formed in die 84. The molten thermoplastic then flows into the interior cavity 71 of the die assembly 30. Strands of fibers 16 enter the diverging radiused inlet 76 at two separate locations and move through the molten thermoplastic contained in cavities 71 and 89 and then they enter and meet and exit the sizing die 91 as a unitary impregnated fiber-reinforced plastic product preferably in the shape of a rod.

The pins 77 alternate relative to their position to the horizontal axis of the die assembly 30 from the inlet 76 to the outlet 74. The pins 77 function to flatten and spread the fibers 16 in order to expose the various filaments which comprise the fibers 16 to the thermoplastic melt flowing in the opposite direction to the fiber 16 feed. The thermoplastic melt flow which is opposite to the direction in which the fibers 16 are traveling creates a rolling and dynamic flow of the thermoplastic about the pins 77, thus increasing the contact of the thermoplastic melt with the spread fibers which are woven over and under the succeeding pins 77. Thus, the die assembly 30 provides a plurality of pins 77 to spread the fibers 16 and increase the surfaces of the fibers for wetting as well as providing rolling and dynamic flow of the thermoplastic melt which is enhanced by the conical shape of the internal cavity 71 of the die assembly 30 and, in turn, enhances the wetting of the filaments of the fibers 16.

Die assembly 30 may be constructed of any one of a variety of materials. Such materials include for example, tool steels, carbon steels, stainless steels and the like. However, preferably die assembly 30 is constructed of a low carbon steel.

The tension on the fibers 16 may be adjusted for different fiber compositions and diameters by varying the pin diameters. The die assembly 30 may also be altered by varying the pin 77 spacing to also affect the tension on the fibers 16 as well as the rate at which the fibers 16 may be fed through the die assembly 30. The pins 77 in the die assembly 30 may also be curved or bowed in order to enhance the spreading of the fibers as they pass through the die assembly 30. Additionally, the pins 77 may be vibrated, with for example, ultrasound at frequencies of 20,000 MHz, in order to enhance the wetting of the fibers 16. Furthermore, the number of pins 77 in each section of the die assembly 30 may be changed in order to improve wetting of the fibers by increasing the number of surfaces that the fibers 16 must travel over and under. However, it will be appreciated that increasing the number of pins 77 may have the disadvantage of affecting the rate at which the fibers 16 may be fed through the die assembly 30.

Of course, it will be further appreciated that it may be possible to alter the relative positions and diameters of the pins 77 so as to overcome any disadvantage that may result from adding additional pins. While a greater number of pins may require a decrease in the operating speed of the process, it may also increase the working of the fibers 16, as well as the tension on the fibers 16, which also depends on the diameter of the pins 77. For the purposes of the present invention, it is preferred that each of the upper 62 and lower 64 sections of the die assembly 30 contain at least four pins.

It is significant that the design of the die assembly 30 in accordance with the present invention allows for the fibers 16 to be fed through the die assembly 30 at a relatively high rate (200 ft/min) in order to give higher output of up to 65 pounds/hour. It is preferred for the purposes of the present invention that rate of the fiber 16 feed be in the range of about 10 to 70 ft/min and that the preferred output is in the range of about 12 pounds/hour. Since the thermoplastic melt can expand within the die assembly 30 due to its conical shape, the pressure is reduced and this results in less resistance to the fibers 16 at the inlet thus providing another benefit. This facilitates the feed of the fibers through the die at a high rate.

In order that there is sufficient flow rate of the thermoplastic melt in the die assembly 30, the die assembly 30 is preferably heated with a band-type heater placed along the outer diameter of the cone 61 and maintained at a temperature in the range of 80°-320° F. above the melt or softening temperature of the thermoplastic being utilized. The thermoplastic melt is fed into the extruder die 84 at a pressure of preferably about 700-1500 psi.

The continuous fibers 16 that may be employed in accordance with the present invention to reinforce the thermoplastic resins are either organic or mineral and contain a plurality of continuous filaments. The fibers 16 are sufficiently long to give what is known in the art as a roving or tow of sufficient strength, under the processing conditions used to be hauled through the molten polymer without high frequency of breakage which would then render the process unworkable. Suitable materials include glass fiber, carbon fiber, jute and synthetic polymer fibers. In the case of synthetic polymer fibers it is important that these fibers conform to the proviso of having sufficient strength to be capable of being hauled or pulled through the thermoplastic without breakage disrupting the process. In order to have sufficient strength to be hauled through the impregnation process without breakage, the majority of the continuous fibers of the fibrous product should lie in one direction so that the fibrous product can be drawn through molten thermoplastic with the majority of continuous fibers aligned. Synthetic fibers that may be utilized within the scope of the present invention include aramid fibers such as Du Pont's KEVLAR ® and polyester, polyamide and acrylic fibers.

The continuous fibers may be in any form having sufficient integrity to be pulled through the molten polymer that conveniently consist of bundles of individual filaments, referred to in the art as "rovings", in which substantially all of the filaments are aligned along the length of the bundles. Any number of such rovings may be employed. In the case of commercially available glass rovings, each roving may consist of up to 2,000 or more continuous glass filaments. Carbon fiber tapes containing up to 50,000 or more carbon filaments may be used. Continuous fibers may be provided with any of the conventional surface sizes, particularly those designed to maximize bonding between the fiber and the matrix polymer. Additionally, other coatings may be included on the fibers, particularly glass fibers such as starch, polyvinyl alcohol or polyvinyl acetate to protect the fibers from abrasion.

Examples of suitable thermoplastics which may be used include polymers and copolymers of $\alpha$-olefins, such as high and low density polyethylene, polypropylene, polybutene, poly-4-methyl pentene-1, propylene-/ethylene copolymers, copolymers of 4-methyl pentene-1 with linear $\alpha$-olefins containing four to 18 carbon atoms, and ethylene/vinyl acetate copolymers; polymers and copolymers of vinyl chloride, vinyl acetate, vinyl butyral, styrene, substituted styrenes such as $\alpha$-methyl styrene, acrylonitrile, butadiene, methyl methacrylate, vinylidene chloride. Specific examples of such polymers include vinyl chloride homopolymers and copolymers of vinyl chloride with vinyl acetate, propylene, ethylene, vinylidene chloride, alkyl acrylate such as 2-ethyl hexyl acrylate, alkyl fumarates, alkyl vinyl ethers, such a cetyl vinyl ether, thermoplastic polyamide precursors; polyimides, polyvinyl acetate; polyvinyl butyral; polystyrene; styrene/acrylonitrile copolymers; polyacrylonitrile; copolymers of butadiene with methyl methacrylate with minor amounts of alkyl acrylates such as methyl acrylate, ethyl acrylate and butyl acrylate; copolymers of methyl methacrylate, polyfluorocarbons, polysilicons and vinylidene chloride/acrylonitrile copolymers; melt processable copolymers of tetrafluoroethylene and hexafluoropropylene.

Halogenated polymers or copolymer may be used; for example halogenated $\alpha$-olefine polymers, such as chlorinated polyethylene, or halogenated vinyl chloride polymers such as chlorinated polyvinyl chloride.

Other thermoplastic polymers that may be used include condensation polymers such as the injection molding grades of linear polyesters such as polyethylene terephthalate; polyamides such as polycaprolactam, polyhexamethylene adipamide and copolyamides such as copolymers of hexamethylene diamine adipate and hexamethylene diamine isophthalate, particularly those containing from 5 to 15 percent by weight of hexamethylene diamine isophthalate; polysulphones and copolysulphones; polyphenylene oxides; polycarbonates, thermoplastic polymers and copolymers of acetols; thermoplastic linear polyurethanes; liquid crystal polymers and the thermoplastic derivatives of cellulose such as cellulose acetate, cellulose nitrate and cellulose butyrate.

The preferred thermoplastic polymers useful within the scope of the present invention include polyesters, polyamides, polysulphones, polyoxymethylene, polypropylene, polyarylene sulphides, polyphenylene oxide/polystyrene blends, polyolefins, polystyrene, styrene-maleic anhydride, polyaryolene ketones, polyacrylates, polyurethanes, halogenated polymers and the mixtures and copolymers thereof.

Where a copolymer is used, the amounts of the comonomers that are used in the various copolymers will depend, inter alia, on the particular application or application envisioned.

Blends of the above-mentioned thermoplastic resins may also be used. For example, blends of polyester/polycarbonate, styrene-maleicanhydride/polycarbonate,ABS/polycarbonate,polyolefin/polyamide, ABS/polyamide and polypropylene/styrene-maleic anhydride.

Nucleating agents may also be included in the thermoplastic polymer. Examples of such nucleating agents include sodium salt, alkali metal salts or alkaline earth metal salts of carboxylic acid, sulfonic acid, carbonic acid, sulfates, silicates, phosphites, phosphonates, phosphinates, etc.

Additives such as light stabilizers, lubricants, heat stabilizers, processing aids, plasticizers, dyes, colorants, pigments, flame retardants, impact modifiers, coupling agents, antioxidants and fillers may be incorporated into the thermoplastic used to achieve a desired appearance, property or combination of properties.

The fiber reinforced thermoplastic products of the processes described hereinabove may be wound on rolls for subsequent use in fabrication processes requiring a continuous product or may be chopped into lengths for subsequent fabrication. The continuous lengths may be used to fabricate articles for example by winding the heat softened product around a form, or, for example, by weaving a mat from tapes or strips of the product. The reinforced product may be chopped into pellets or granules in which the aligned fibers have lengths from 3 mm up to 100 mm or more. These may be used in conventional molding or extrusion processes, compression, rotational and transfer molding. The reinforced products may take any one of a variety of shapes, including for example, cylindrical, I-beam, square, triangular, sheet or rectangular shapes. Additionally, the reinforced products may be formed with hollow cavities such as is the case with a hose or a pipe.

When glass fibers are used, the fiber content of the pellet of the invention should generally be at least about 20% by weight of the pellet in order to maximize the physical properties of the pellet and products produced therefrom. The upper limit of fiber contact is determined by the amount of polymer required to wet out the individual fibers of the roving. In general it is difficult to achieve good wetting with less than 20% by weight of the polymer although excellent results are obtainable using the process of the invention to incorporate 30% by weight of polymer in the pellets.

The principles of the present invention may also be utilized to produce tapes. Tapes are particularly useful for forming articles woven using a tabby or satin weave (these terms are used in the weaving art and are described in the Encyclopedia Britannica article on "weaving"). A satin weave gives a particularly good product as shown in the examples of this specification. Woven articles of exceptionally high performance are obtained using the tapes produced according to this invention and having a breadth of tapes at least ten times the thickness of the tape. An important application is as a thin reinforced sheet which is to be used to form a reinforced article from a number of plies of the reinforced sheet, with the reinforcement of each layer disposed in any chosen direction in the plane of the layers, by compressing the layers at a temperature sufficient to cause the polymers of the layers to coalesce. The layers may be used as flat sheets which may be shaped in the mold during or after the coalescing stage where they may wound or formed on a shape mandril which after a coalescing stage gives an article having the shape of the mandril.

The pultruded products of the invention are also suitable, when chopped to appropriate dimensions for providing selective reinforcement in shaped articles or structures molded from polymeric materials in a process in which at least one free formed element consisting of a product according to the present invention is located in a mold to provide reinforcement in a selected portion of the finished molding and polymeric material is molded around the in situ reinforcement to provide a shaped article.

It may be advantageous in some applications to use the preformed element at a temperature at which it is readily pliable so that it can be more readily located in the mold, for example, by winding the heat softened preformed element on a mold insert.

The molding process used may be any process in which a shaped article is formed from a polymeric material in a mold. The polymeric may be thermoplastic material which is introduced into the mold as a melt, such as in injection molding or as powder, as in compression molding. Included in the term "compression molding" is the process of compressing a polymer powder without melting and subsequently sintering the "green" molding outside the mold. The thermoplastics polymeric material molded in the mold may also be derived by introducing into the mold a monomer or monomers, or a partially polymerized medium which is held in the mold until fully polymerized, for example, under the influence of heat or chemical activators or initiators. It is preferred that the polymer which is molded around the preformed insert is the same as or is at least compatible with the polymer used to impregnate the preformed insert.

The impregnated products obtained from the processes hereinbefore described find particular utility when chopped into pellets or granules in which the reinforcing fibers have a length of at least 5 mm and preferably at least 10 mm. These products may be used in the conventional fabrication process such as injection molding and show advantages over prior art products in pellet form because the fiber length in the pellet is retained to a much greater extent in articles fabricated from the pellets of the invention than when using the prior art products. This greater retention of fiber length is believed to be a result of the greater protection afforded to the individual reinforcing filaments in the product of the invention by virtue of the good wetting by polymer which arises from use of the processes hereinbefore described.

This aspect of the invention is particularly important because it enables reinforced articles to be formed in versatile operations, such as injection molding, which employ screw extrusion processes to melt and homogenize the feed material, with a surprisingly high retention of fiber length and consequent enhancement of physical properties. Thus, the product of the invention enables molded articles to be obtained from fabrication processes which employ screw extrusion which articles contain at least 30% and preferably at least 70% by weight of the fibers in the article of a length at least 3 mm long. This is considerably longer than currently obtainable from the commercially available reinforced products. An alternative process of forming molded articles by melting and homogenizing short lengths, that is lengths between 2 and 100 mm, of the reinforced products of the invention is by calendaring. For example, a sheet product can be made in this manner.

The products suitable for injection molding may be used directly or may be blended with pellets of other thermoplastics products. These other products may be of the same polymer but having higher molecular weight or may be of a different polymer providing that the presence of the different polymer does not adversely affect the overall balance of properties of the composition. The other products may be an unfilled polymer or may contain a particulate or fibrous filler. Blends with material containing the conventionally produced reinforced molding powders, that is molding powders with reinforcing fibers up to about 0.25 mm long are particularly suitable because the overall reinforcing fiber content of the blend can be kept high to produce maximum strength even though the shorter reinforcing fibers do not contribute so effectively as the long fibers present from the product of the present invention.

Although the use of relatively low molecular weight polymers in the process of the invention is desirable to achieve adequate wetting of the roving and although it is surprising that such a product has such high levels of physical properties the invention does not exclude the subsequent processing step of increasing the molecular weight of the polymer in the composition by known techniques. Such techniques include solid phase polymerization in the case of increasing the molecular weight using cross-linking agents it is necessary to intimately mix these in the composition. This may only be practicable if they are already present during the impregnation process but in such cases care must be taken to ensure that they are not activated before the wetting process is complete.

The following examples will serve to illustrate the novel features and advantages of the present invention. While these examples will show one skilled in the art how to operate within the scope of this invention, they are not to serve as a limitation on the scope of the invention where such scope is only defined in the claims.

EXAMPLE I

Nylon 6 is used to prepare polymer melts in an extruder at a melt temperature of approximately 310° C. Four glass rovings containing 2,000 individual filaments (2 rovings through the pins of the upper section 62 and 2 rovings through the pins of the lower section 64) are pulled through the die assembly 30 through which molten polymer is fed in through the outlet of the feed opening 93 under a pressure of about 1000 psi. The impregnated roving leaving the die assembly 30 is passed through a water-cooled bath and hardened. A complete wetting of the glass rovings is obtained.

EXAMPLE II

A conventional grade of PPS (polyphenylene sulfide) is used to prepare polymer melts in an extruder at a melt temperature of about 345° C. Four glass rovings containing 2,000 individual filaments are pulled through the die assembly 30 through which molten PPS is fed in through the feed opening 93. The coated roving is cooled in a water shower upon exiting the die assembly 30. Complete wetting of the roving filaments is achieved.

Figure 5:
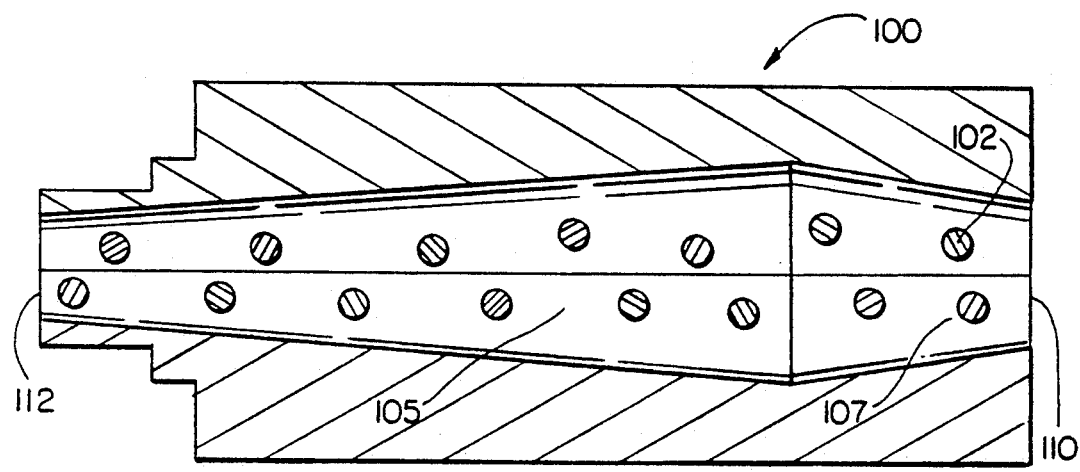
FIG. 5 is a longitudinal cross-sectional scale view of another preferred embodiment of a die assembly made in accordance with the principles of the present invention.

Referring now to FIG. 5 there is illustrated another preferred embodiment of a die assembly 100 made in accordance with the present invention. Die assembly 100 is substantially similar to die assembly 30 with the exception that it contains additional pins 102 and the cone-shape cavity 105 includes a tapered portion 107 in the proximity of the inlet 110. Tapered portion 107 is conical in shape and it includes as shown a diverging radius going from the inlet 110 to the outlet 112.

Although the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the following claims.

What is claimed is:

1. A process for producing a fiber reinforced thermoplastic structure having a high fiber concentration comprising:
    a) feeding two or more multifilament fibers into an inlet of a die assembly having a sizing die and a cone including a cone-shape passage, said cone-shape passage having a converging radius outlet and a diverging radius inlet, such cone being divided into at least two die sections, each of such die sections having disposed therein a plurality of pins for spreading such fibers to achieve a good wetting of said filaments such that such feeding includes feeding at least one of said fibers into each of said die sections, such plurality of pins disposed within each of such die sections having an axis, a position relative to such axis of each of such succeeding pins within each of such selections alternating from such inlet to such outlet of such cone-shape passage,
    b) feeding under pressure a thermoplastic melt into such cone-shape passage of such die assembly to coat and wet such multifilament fibers being fed through such die assembly in an opposite direction, and
    c) obtaining fully wetted filaments at the outlet of such sizing die.

2. The process according to claim 1 wherein such pins are bowed.

3. The process according to claim 1 wherein each of such sections contains at least four pins and wherein one of said sections has a different number of pins from the other of such sections and wherein the diameter of such pins is set to determine the level of tension for such fibers fed through such die.

4. The process according to claim 1 wherein such cone of such die assembly is heated and such cone includes a non-radiused portion.

5. The process according to claim 1 wherein such fibers are fed through such inlet of such cone such that at least one of such multifilament fibers is passed over and under each of the succeeding pins of one of such die sections and at least one other of such multifilament fibers is passed over and under each of the succeeding pins of the other of such die sections from such inlet of such cone-shape passage to such outlet of such cone-shape passage.

6. The process according to claim 5 wherein the melt flow of such thermoplastic melt is dynamic and rolling about each of such pins thereby maximizing the wetting of such spread fibers contacting such pins.

7. The process according to claim 6 wherein such thermoplastic melt is fed into such cone at such outlet of such cone-shape passage.

8. The process according to claim 1 wherein such thermoplastic is selected from the group consisting of polyesters, polyamides, polysulphones, polyoxymethylene, polyolefins, styrene-maleic anhydride, PES, polyimides, liquid crystal polymers, polycarbonate, polyarylene sulphides, polyphenylene oxide/polystyrene blends, polystyrene, polyetherketones, polyacrylates, polyurethanes, halogenated polymers and the mixtures and copolymers thereof.

9. The process according to claim 1 wherein such fibers entering such die assembly meet at the exit of said die assembly to form a unitary fiber-reinforced structure wherein such impregnated fibers are produced at a high rate and such fiber reinforced thermoplastic structure contains a high concentration of fibers.

10. The process according to claim 1 wherein such cone comprises two substantially similar upper and lower die sections releasably attached to an extruder die having a nozzle into which such thermoplastic melt is fed into by an extruder.

* * * * *